US008292510B2

(12) United States Patent
Glahn et al.

(10) Patent No.: US 8,292,510 B2
(45) Date of Patent: Oct. 23, 2012

(54) DUAL MODE SCAVENGE SCOOP

(75) Inventors: Jorn A. Glahn, Manchester, CT (US); Denman H. James, Windsor, CT (US); William G. Sheridan, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 1032 days.

(21) Appl. No.: 11/540,111

(22) Filed: Sep. 28, 2006

(65) Prior Publication Data

US 2008/0078617 A1 Apr. 3, 2008

(51) Int. Cl.

*F16C 19/00* (2006.01)
*F01D 25/18* (2006.01)
*F01M 1/00* (2006.01)

(52) U.S. Cl. ....................... 384/462; 184/6.11; 184/11.2

(58) Field of Classification Search ................. 184/6.11, 184/6, 6.12, 55.1, 11.1, 11.2, 11.4; 55/423, 55/462, 465, 466; 384/462, 465, 466, 467, 384/473, 474

See application file for complete search history.

(56) References Cited

U.S. PATENT DOCUMENTS

| | | | | |
|---|---|---|---|---|
| 3,529,698 | A * | 9/1970 | Nelson | 184/6.12 |
| 4,257,793 | A * | 3/1981 | Kimishima et al. | 55/394 |
| 4,433,539 | A | 2/1984 | Norris et al. | |
| 4,630,711 | A * | 12/1986 | Levrai et al. | 184/6.12 |
| 4,879,921 | A * | 11/1989 | Asada et al. | 74/467 |
| 5,114,446 | A | 5/1992 | Giersdorf et al. | |
| 5,261,751 | A | 11/1993 | Heinz | |
| 5,494,355 | A | 2/1996 | Haase | |
| 7,059,443 | B2 * | 6/2006 | Kira | 180/243 |
| 7,387,445 | B2 * | 6/2008 | Swainson | 384/462 |
| 7,556,674 | B2 * | 7/2009 | Andersson | 95/267 |
| 2004/0154846 | A1 * | 8/2004 | Kira | 180/65.6 |

FOREIGN PATENT DOCUMENTS

| | | | |
|---|---|---|---|
| EP | 1544417 | A2 | 6/2005 |
| GB | 947789 | A | 1/1964 |
| JP | 61271121 | A * | 12/1986 |
| WO | WO 2005114053 | * | 12/2005 |

* cited by examiner

*Primary Examiner* — Thomas R Hannon
*Assistant Examiner* — Alan Waits
(74) *Attorney, Agent, or Firm* — Bachman & LaPointe, P.C.

(57) ABSTRACT

A system for removing oil from a bearing compartment has a port connected to an end wall of the compartment through which the oil exits the compartment, a scavenge scoop connected to the port for collecting the oil, and a separation device connected to the scavenge scoop for creating an oil collection region.

6 Claims, 3 Drawing Sheets

DUAL MODE SCAVENGE SCOOP

STATEMENT OF GOVERNMENT INTEREST

The Government of the United States of America may have rights in the present invention as a result of Contract No. N00019-02-C-3003 awarded by the United States Navy.

BACKGROUND OF THE INVENTION (1) Field of the Invention

The present invention relates to a system for efficient oil discharge from an engine.

(2) Prior Art

A typical engine bearing compartment is provided with oil through jets for the purpose of bearing lubrication and compartment cooling. A sealing airflow is provided in an upstream cavity and enters the bearing compartment through holes inside a rotating disc. Additional seal airflows are provided to the seals and prevent oil leakage out of the compartment's outer and inner rotor/stator interface.

In general, air and oil flows mix inside bearing compartments and generate a high velocity swirling flow pattern that forms a liquid wall film along the internal compartment walls. In the case of an oil film flow along a rotating wall, the oil film will be pumped by the centrifugal acceleration to the free end of the shaft where it will separate, disintegrate into droplets, and flow radially outwards until it coalesces on another surface. In the case of oil coalescence on a stationary surface, superimposed effects of interfacial shear and gravitational forces will dominate the oil film motion. In any bearing compartment cavity with rotating inner shaft and stationary outer wall, at some circumferential position downstream of bottom dead center (BDC), the oil film flow along the stationary wall will be exposed to counter-current effects of interfacial shear and gravitation. Gravitational forces tend to pull the oil film toward BDC, whereas interfacial shear tries to push the oil away from BDC. In addition, high interfacial shear will destabilize the liquid wall film flow and tends to entrain oil into the air stream. As a result, airflows that are supposed to be discharged through breather pipe(s) out of the bearing compartment always carry a certain amount of oil with them. In order to manage air and oil flows through bearing compartments efficiently, i.e. to maintain a positive seal pressure differential to prevent oil leakage and to minimize oil consumption and breather mist generation, low breather pipe oil content is desirable, especially at sub-idle and idle operation of the engine.

Thus, the bearing compartment has to be designed such that mixing air and oil is minimized. One element in achieving low breather pipe oil content is to reduce the residence time of the oil inside the bearing compartment by providing efficient means of scavenging the oil, and, therefore, minimizing the amount of oil that is exposed to the destabilizing effect of interfacial shear stresses.

A typical tangential scavenge port has scavenge scoops which are intended to discharge mainly oil and are usually located at or close to BDC. It is recognized however that due to strong air/oil interactions inside the bearing compartment cavities, oil film flows along the stationary surfaces usually contain significant air inclusion (bubbles) and a foamy air/oil layer close to the gas/liquid interface. The air content in the liquid film flow tends to increase flow area requirements for efficient discharge.

In order to connect the scavenge port with the plumbing of the lubrication system, the designer faces the challenge of providing means of directing a two-phase air/oil mixture with high circumferential flow velocity and significant velocity differences between both media into an axial or radial flow direction. In order to direct the swirling bearing compartment two phase air/oil mixture from a circumferential to an axial or radial exit pipe flow direction, current systems use tangential scoops that capture as much of the bearing cavity width as possible and transition into an integrated 90 degree bend that connects to the exit pipe. Due to minimum length requirements for the 90 degree bend, scavenge ports of this kind have an inlet plane that has to be located several degrees upstream of BDC. Oil that is provided to the bearing compartment cavity downstream of this inlet plane has to be carried by interfacial shear forces around the compartment and across Top-Dead-Center (TDC) until it can reach the inlet plane or it will collect in the bottom of the cavity. The former is usually achieved at high power settings, the latter is the dominant flow pattern at low power settings such as motoring, windmilling, or idle.

Since oil must be discharged efficiently at both low and high power regimes, the single scavenge port must be compromised slightly to work in both conditions. In some applications, two scavenge ports are used to capture oil at low power and high power. Because the fluid within the compartment is two phase air/oil, the two scavenge ports must be connected to separate pump stages to avoid loss of prime in the pump. If two scavenge ports are connected to a single pump stage, there is a propensity to scavenge only the lower density air, allowing the oil to puddle up within the compartment, create significant heat generation, and greatly increase the risk of oil leakage. It is therefore desirable to have a highly efficient scavenge port that works at low and high power with only a single pump stage, which is obviously lower in density and cost.

In order to allow drainage of oil that is not captured by the tangential scoop and collects in the sump of the compartment, drain holes are integrated into the tangential scoop/bend arrangement at BDC. This arrangement works satisfactorily for certain minimum compartment sump dimensions (radial distance between rotating shaft and outer stationary wall) and moderate rotational speeds. However, as size constraints for engine cores become more severe and engine speeds increase, limitations of this type of scavenge port arrangement become apparent—especially for cases where the compartment height approached the exit pipe diameter, which means that the tangential inlet scoop blocks the whole radial depth of the cavity. This blockage results in a severe reduction of interfacial shear, which would be required at high levels in order to drive all oil across TDC. The impact of these limitations depends strongly on the oil flow distribution at low power settings. As the size of the sump region decreases, the distance between the compartment seals and the free surface of the oil pool decreases, increasing the risk of oil leakage. This phenomenon is aggravated by the fact that the interfacial shear acting on the gas/liquid interface pushes oil away from the drain at BDC, forming a large recirculation zone several degrees downstream of BDC. This recirculation zone tends to contaminate the seals and causes oil leakage out of the compartment.

SUMMARY OF THE INVENTION

In accordance with the present invention, a system for removing oil from a bearing compartment is provided. The system broadly comprises a port connected to an end wall of the compartment through which the oil exits the compartment, a scavenge scoop connected to the port for collecting oil, and a separation device connected to the scavenge scoop for creating an oil collection region.

Further in accordance with the present invention, a bearing compartment is provided. The bearing compartment broadly comprises a bearing, means for introducing an airflow into the compartment, means for introducing a flow of oil into the compartment to lubricate the bearing and cool the compartment, means for introducing an airflow into said compartment to reduce the leakage of any oil from the compartment, and means for removing the oil from the compartment. The oil removing means comprises a port connected to an end wall of the compartment through which the oil exits the compartment, a scavenge scoop connected to the port for collecting oil, and a separation device connected to the scavenge scoop for creating an oil collection region.

Other details of the dual mode scavenge scoop of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
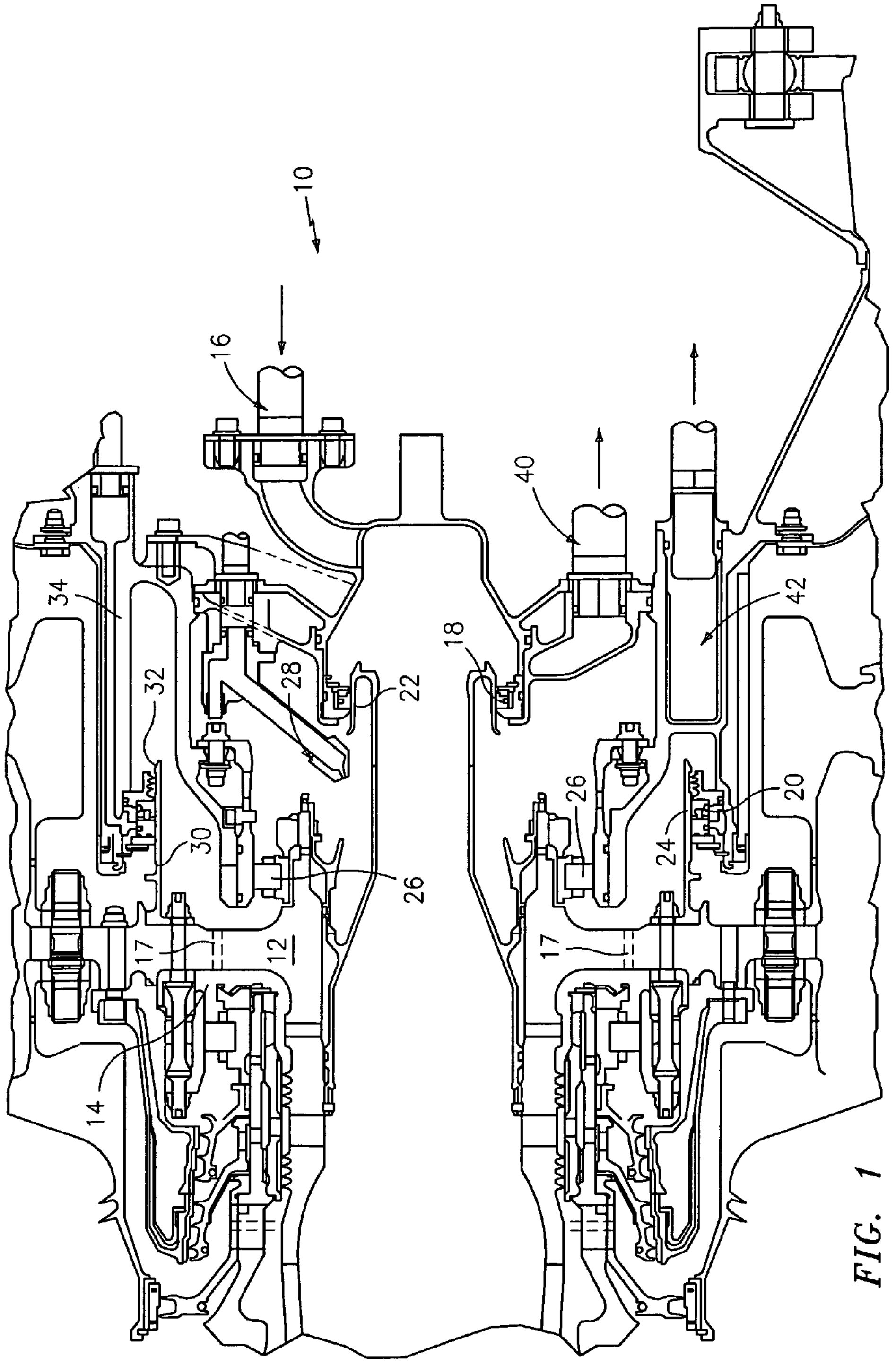
FIG. 1 is a plan view of a bearing compartment within an engine.

Referring now to FIG. 1, there is shown a bearing compartment 10 for an engine. At one end of the compartment 10, there is a rotating disk 12 and an upstream cavity 14. Sealing airflow is provided to the upstream cavity 14 via the buffer port 16 and a suitable conduit or piping system. The sealing airflow enters the bearing compartment 10 through holes 17 inside the rotating disk 12. Additional seal airflows are provided to the seals 18 and 20 to prevent oil leakage out of the compartment's outer and inner rotor/stator interfaces 22 and 24.

The compartment 10 contains one or more bearings 26. Oil is provided through the oil supply nozzle 28 for the purpose of bearing lubrication and compartment cooling. In general, air and oil flows mix inside the bearing compartment 10 and generates a high velocity swirling flow pattern that forms a liquid wall film along the internal compartment walls. In the case of an oil film flow along a rotating wall 30, the oil film will be pumped by the centrifugal acceleration to the free end of the shaft 32, where it will separate, disintegrate into droplets, and flow radially outwards until it coalesces on another surface. As noted before, in the case of oil coalescence on a stationary surface 34, superimposed effects of interfacial shear and gravitational forces will dominate the oil film motion.

The compartment 10 is provided with one or more breather ports 40 through which an air/oil mist is carried out of the compartment 10. The compartment 10 is also provided with a scavenge port 42 through which oil is carried out of the compartment.

Figure 2:
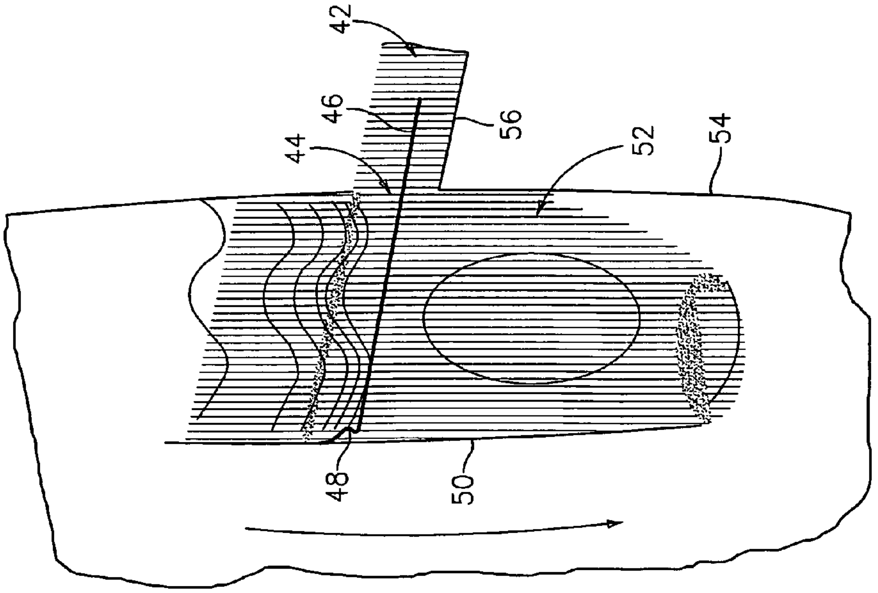
FIG. 2 illustrates an embodiment of a dual mode scavenge scoop in accordance with the present invention.

Referring now to FIG. 2, there is shown a first embodiment of a tangential scavenge scoop 44 in accordance with the present invention. As can be seen from this figure, the scavenge scoop 44 has a first wall 46 which extends into the scavenge port 42 and a second wall 48 at an angle to the first wall 46. A separation wall 50 is connected to the scavenge scoop 44 at the second wall 48 to create a settling cavity or sump region 52 with the compartment end wall 54. If desired, the separation wall 50 may be integrally formed with the second wall 48 of the scavenge scoop 44. The separation wall 50 serves to shield the settling cavity or sump region 52 against the rotor. As can be seen from this figure, the settling cavity or sump region 52 connects directly into the exit pipe 56 of the scavenge port 42. As can be seen from this figure, half of the diameter of the exit pipe 56 has been dedicated to the downstream portion of the sump, where as the other half is still sufficient to process the upstream air/oil mixture that is captured by the tangential scavenge scoop 44. The separation wall 50 is advantageous in that it reduces the size of any recirculation zone and maintains it substantially within the sump region 52.

Figure 3:
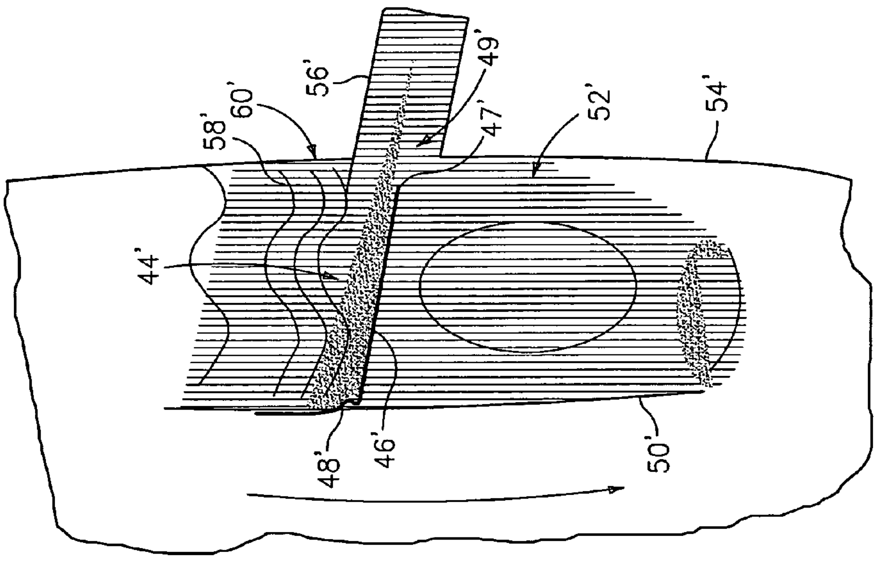
FIG. 3 illustrates an alternative embodiment of a dual mode scavenge scoop in accordance with the present invention.

Referring now to FIG. 3, there is shown an alternative embodiment of the present invention. In this embodiment, the tangential scavenge scoop 44' has a first wall 46', which does not extend into the exit pipe 56', and a second wall 48'. The first wall 46' terminates at an end 47' which is at a distance from the entrance 49' of the exit pipe 56'. A baffle 58' is mounted to the compartment end wall 54' just upstream of the entrance 49' to the exit pipe 56' to create a small recirculation region 60'. In this way, excessive scavenge inlet pressure losses that may be expected from a cross flow of oil may be avoided. As before, the settling cavity or sump region 52' created by the separation wall 48' connects directly into the exit pipe 56' of the scavenge port 42. The exit pipe 56' also receives the upstream air/oil mixture that is captured by the tangential scavenge scoop 44'.

Figure 4:
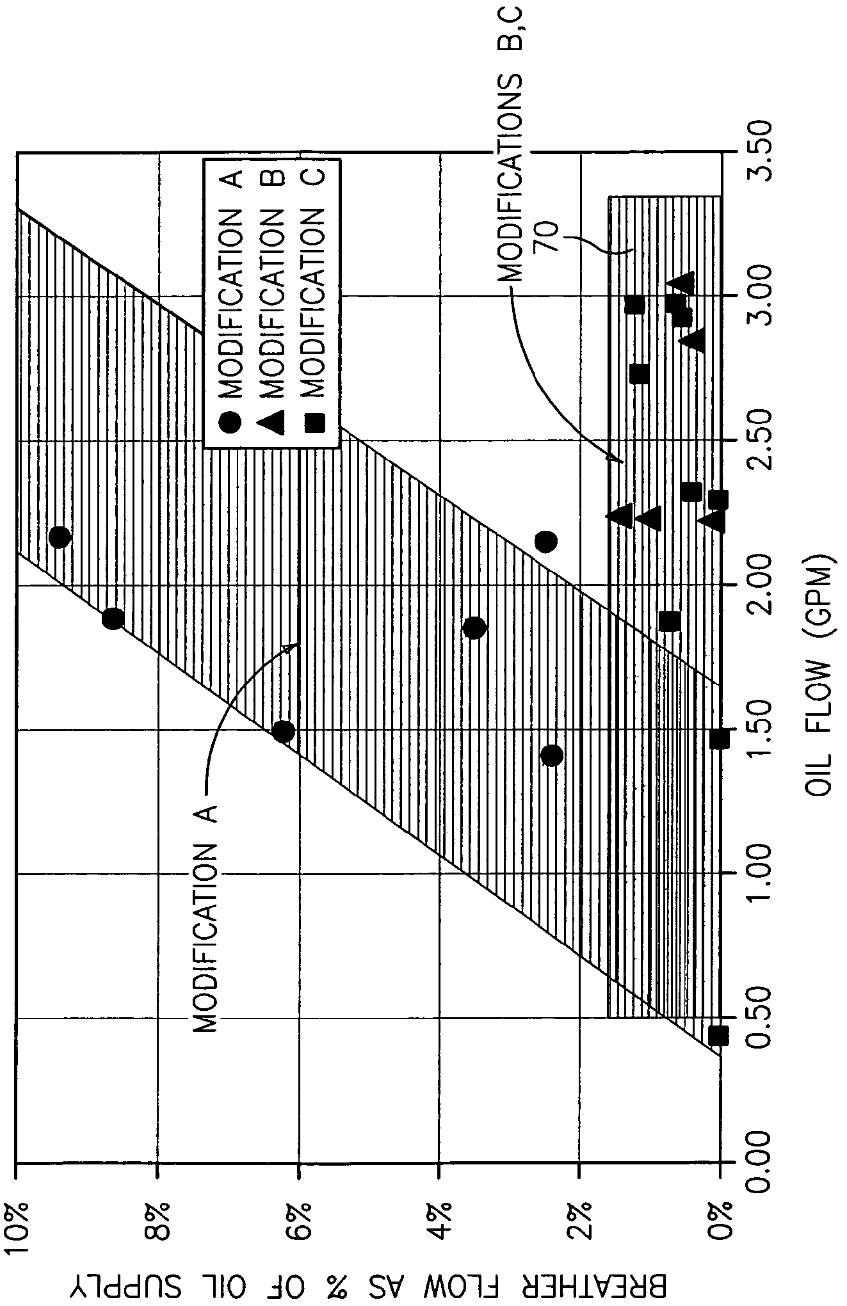
FIG. 4 is a graph showing breather flow as a percentage of oil supply vs. oil flow for the embodiments of FIGS. 2 and 3.

Referring now to FIG. 4, there is shown the results of a test where the embodiments shown in FIGS. 2 and 3 (Modifications B and C respectively) were compared to a tangential scavenge scoop arrangement without the separation wall (Modification A). It can be seen from this figure that the breather oil flow rate for the modifications B and C (shaded area 70) is at a very desirable level of less than 2% of the total, whereas the breather oil flow rate for modification A as a function of oil flow increases above 2% of the total as oil flow increases. It also has been found that the relative breather oil flow rate for modifications B and C is independent of total oil, which indicates sufficient scavenging capacity.

The dual mode oil scavenge scoop of the present invention is a novel solution in that the single scavenge port 42 works well on both high and low power regimes. As used herein, the terms "high" and "low" power regimes are primarily characterized by the rotational speed of the rotor. The rotor imposes an interracial shear on the liquid wall film and, therefore, drives the oil film in circumferential (rotational) direction. Depending on the location around the circumference, gravitational forces may assist or counteract that driving force. If one envisions a situation where the oil film would have to flow uphill, it takes a significant interfacial shear to overcome gravitation forces that want to keep the oil at the bottom. In this sense, a high power setting is one that imposes enough interfacial shear to drive all the oil over top-dead center.

The dual mode scavenge scoop of the present invention offers significant cost and weight benefits to more conventional solutions, and is therefore desirable for aircraft applications.

If desired, two scavenge lines and pump stages can be added to capture the oil and all operating conditions.

It is apparent that there has been provided in accordance with the present invention a dual mode scavenge scoop which fully satisfies the objects, means, and advantages set forth hereinbefore. While the present invention has been described in the context of specific embodiments thereof, other unforeseen alternatives, modifications, and variations may become apparent to those skilled in the art having read the foregoing description. Accordingly, it is intended to embrace those alternatives, modifications, and variations as fall within the broad scope of the appended claims.

What is claimed is:

1. A system for removing oil from a bearing compartment comprising:

a port connected to an end wall of said bearing compartment through which said oil exits said bearing compartment;

said port having an exit pipe which has an inlet formed by an opening in said end wall of said bearing compartment;

a scavenge scoop connected to said port for collecting oil;

said scavenge scoop having a first wall and a second wall at an angle to the first wall;

a separation wall connected to the scavenge scoop at the second wall to create a sump region with the bearing compartment end wall for collecting oil, said sump region being located within the bearing compartment; and said exit pipe receiving oil from both sides of said scavenge scoop.

2. The system according to claim 1, wherein said scavenge scoop is a tangential scavenge scoop.

3. The system according to claim 1, further comprising said first wall extending into said exit pipe.

4. The system according to claim 1, further comprising said first wall terminating at a distance from an entrance to said exit pipe, and a baffle mounted to said end wall.

5. The system according to claim 1, wherein said separation wall is attached to said second wall.

6. The system according to claim 1, wherein said separation wall is integrally formed with said second wall.

* * * * *